United States Patent [19]
Vitat et al.

[11] 3,889,930
[45] June 17, 1975

[54] APPARATUS FOR ELIMINATION OF SURFACE WATER FROM ARTICLES

[75] Inventors: Jean-Claude Vitat, Antony; Jean-Robert Thebault, Paris; Jean-Pierre Remond, Massy-Villaine, all of France

[73] Assignee: Rhone-Progil, Courbevoie, France

[22] Filed: Feb. 14, 1974

[21] Appl. No.: 442,373

[30] Foreign Application Priority Data
Feb. 15, 1973  France .................... 73.05345

[52] U.S. Cl. .................... 259/4; 134/184; 134/60; 137/341; 137/575
[51] Int. Cl. ............................................ B01f 15/06
[58] Field of Search ........... 259/4, 18, 36, 60, 61; 137/571, 575, 576, 341; 134/107, 184, 60, 1

[56] References Cited
UNITED STATES PATENTS

| | | |
|---|---|---|
| 1,045,079 | 11/1912 | Hertenbein .................... 134/60 |
| 3,123,084 | 3/1964 | Tardoskegyi .................... 259/DIG. 44 |
| 3,608,871 | 9/1971 | Harsanyl .................... 137/571 |
| 3,614,069 | 10/1971 | Murry .................... 259/DIG. 44 |
| 3,700,937 | 10/1972 | Rissolo .................... 259/DIG. 44 |
| 3,831,905 | 8/1974 | Htoo .................... 259/4 |

*Primary Examiner*—Robert W. Jenkins

[57] ABSTRACT

Apparatus for removing water from the surface of an article by immersion in a liquid composition which is immiscible with water embodying an arrangement of a water removal tank, a rinsing tank, a water settling tank, and recycling circuit for passing liquid composition from the water settling tank to the water removal tank, the water removal tank having a liquid inlet connected to a liquid outlet of the rinsing tank, heating means for heating liquid composition in the water removal tank, and an overflow device extending about at least 40% of the periphery of the water removal tank.

18 Claims, 15 Drawing Figures

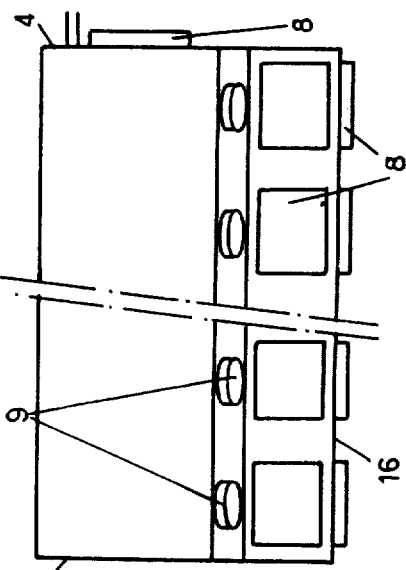
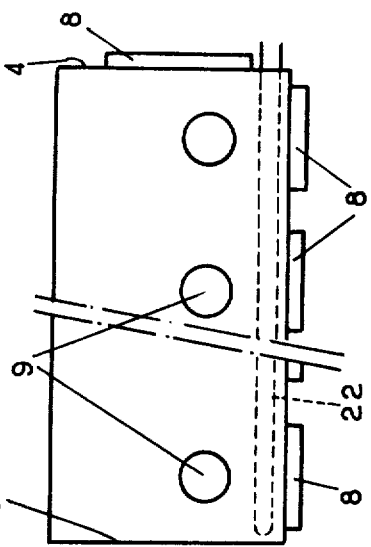
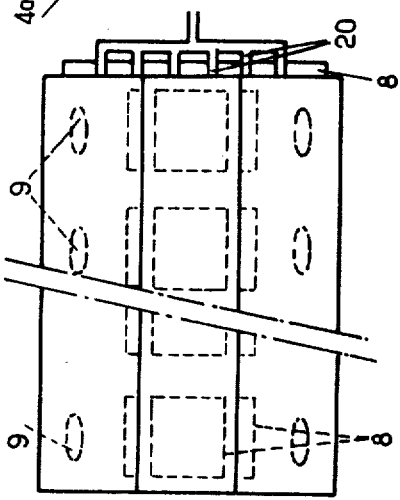
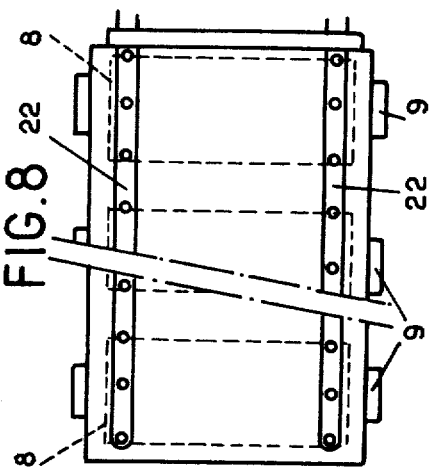
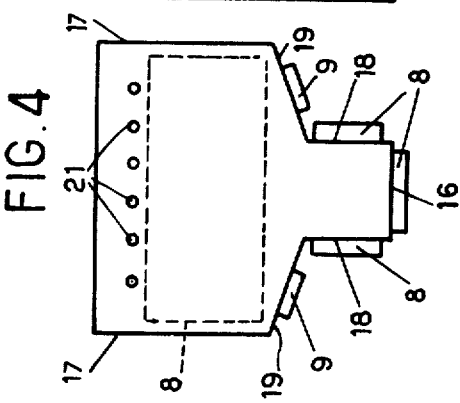
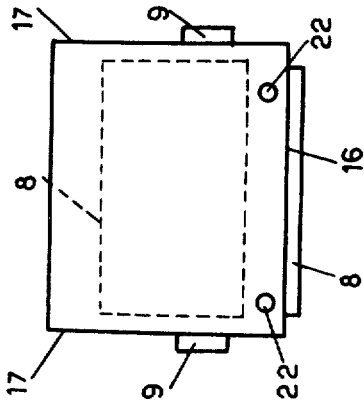

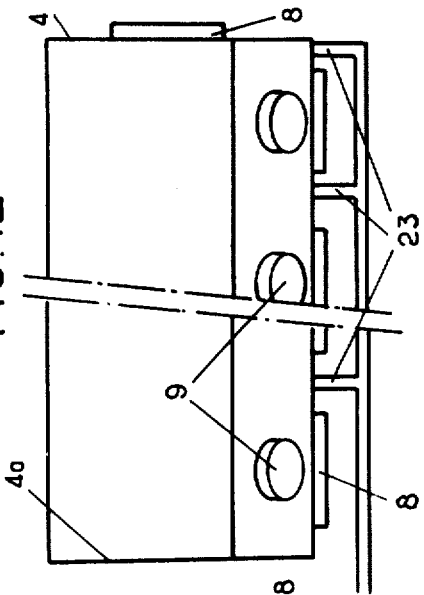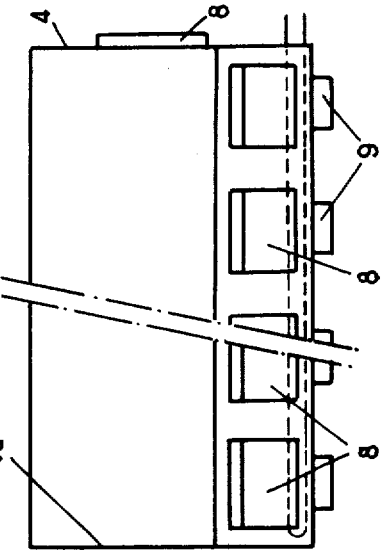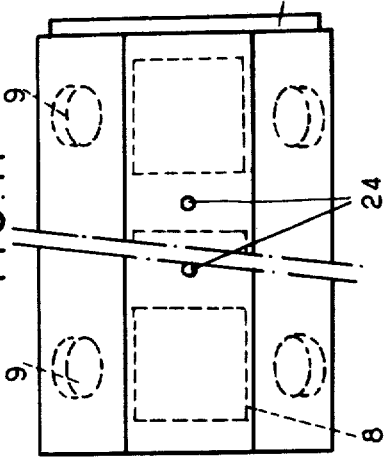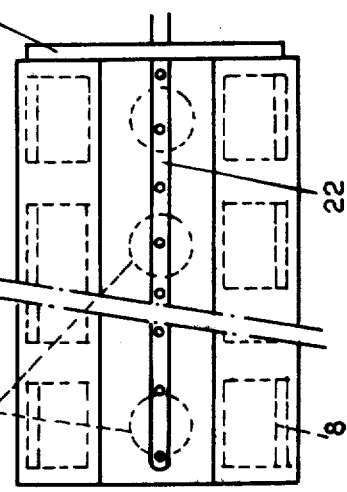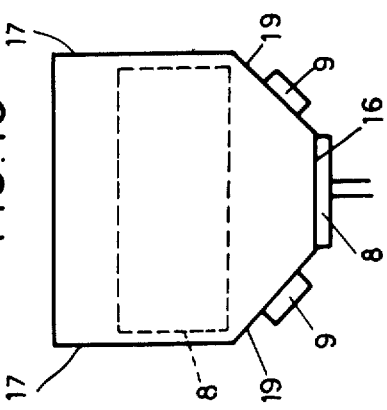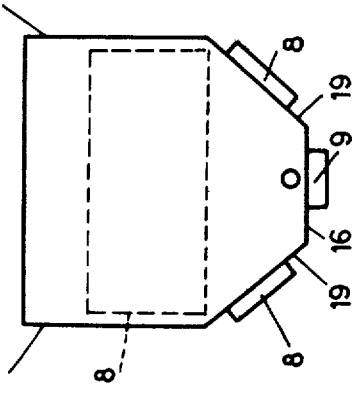

APPARATUS FOR ELIMINATION OF SURFACE WATER FROM ARTICLES

This invention relates to an apparatus for removing water from the surface of an article by immersion in a liquid composition which is immiscible with water.

During the treatment of numerous articles, the articles are brought into contact with water which has a tendency to wet their surfaces. Thus, during the course of machining and cleaning water is retained on their surfaces. Similarly, in the electrical and electronic industries, the elements to be cleaned often have as support various plastic materials and, in certain cases, the pieces to be surface cleaned are washed with water for the purpose of first removing, for example, residual hydrosoluble salts or aqueous welding fluxes. In other cases, simply the humidity content of the ambient air has an adverse effect upon the correct functioning of the parts, if these parts have not been dried before use and protected in sealed enclosures. Moreover, the presence of water upon metal surfaces exposes them to the phenomenon of corrosion, which may produce an undesirable alteration in the mechanical and/or electrical properties.

It is known that water may be removed from the surface of an article by a method which consists of immersing said article successively in a water removal bath A, which is generally kept boiling and contains a liquid composition which is immiscible with water, followed by a rinsing bath B, also kept generally at boiling temperature and constituted of the solvent which forms the essential part of the liquid composition, followed by passing the article through the vapors constituted essentially of solvent issuing from baths A and B. In a continuous process, said vapors are condensed, the water which may be present in the condensate is removed, the condensed solvent is passed into the bath B, the excess solvent from bath B is passed into bath A, and the excess of liquid in bath A is taken off and then recycled into bath A after removal of the water.

Liquid compositions which are suitable for use are described in French Pat. No. 2,040,733, issued to Produits Chimiques Pechiney-Saint-Gobain.

Such a method may be carried out in an apparatus comprising a water removal tank, a rinsing tank, at least one tank for settling the water and a recycling circuit composition connecting the water settling tank to the water removal tank, the water removal tank having a liquid inlet for liquid coming from the rinsing tank and means for heating the liquid composition.

It is known that, where existing apparatus comprising a water removal tank of large dimensions is involved, such as may be necessary for reasons of production rate and/or for treating articles of great length, stagnant zones are observed in the water in said tank when the above described method is being carried out.

It is also known that the apparatus heretofore used is so designed that the water settling tank, the water removal tank, and the rinsing tank are aligned and the apparatus is consequently of great total length; this may result in difficulties in plant layout in workshops.

The apparatus according to the invention, which may comprise a water removal tank of large dimensions, does not present these drawbacks and it is an object of this invention to provide such improvement in apparatus.

In certain cases, the articles to be treated must be subjected to pretreatments such, for example, as cleaning in aqueous medium, by successive immersions in baths of compositions contained in tanks. In such cases it is advantageous, in order to enable a process which is continuous both with regard to the pretreatment and with regard to the removal of the water to be carried out, to effect an automatic transfer of the articles from the outside of the apparatus to the first pretreatment bank, from each of the pretreatment tanks to the next, from the last pretreatment tank to the water removal tank, from the water removal tank to the rinsing tank, and from the rinsing tank to the outside of the apparatus. In order that the realization may be simple, the automatic transfer of the articles from one tank to the next should be carried out without change in the principal direction; this implies that the tanks are arranged along a sufficiently close alignment for a number of vertical planes to exist, which cut through all the tanks. The alignment, in the water removal apparatus heretofore used, of the water settling tank, the water removal tank and the rinsing tank, means that the last pretreatment tank and the water removal tank cannot be juxtaposed, because the water settling tank must of necessity be inserted therebetween. Since the distance between the positions at which the articles are immersed respectively into the last pretreatment tank and into the water removal tank must, in order to satisfy the requirements of automatic transfer, be a whole multiple of the distance between the positions of immersion respectively into two successive pretreatment tanks, it must therefore be equal to at least twice the latter distance. It follows that, in the most favorable hypothesis, the automatic transfer of the articles from the last pretreatment tank into the water removal tank is carried out in two stages, the articles being arrested in the surrounding air above the water settling tank. This implies that the position of the water settling tank relative to the other tanks is such that the level of the liquid bath in said settling tank is situated below the horizontal plane in which the articles are situated when immersed in the tanks; this leads to an increase in the overall vertical size of the whole apparatus. In addition, while the articles are arrested in the surrounding air, evaporation of the water from them takes place, which may result in the formation of residues leading to stains which cannot be fully removed by the later treatment for removing the water.

The apparatus according to the invention is so designed that the water removal tank can be juxtaposed to such a last pretreatment tank.

Accordingly the present invention provides apparatus for removing water from the surface of an article by immersion in a liquid composition which is immiscible with water, comprising a water removal tank, a rinsing tank, a water settling tank, a recycling circuit for passing liquid composition from the water settling tank to the water removal tank, the water removal tank having a liquid inlet connected to a liquid outlet of the rinsing tank, heating means for heating liquid composition in the water removal tank, and an overflow device extending around at least 40% of the periphery of the water removal tank, in which, the water removal tank, the liquid inlet, the overflow device and the heating means possess a common vertical plane of symmetry and in which the water removal tank, the rinsing tank and the water settling tank are so disposed that at least a portion of the vertical planes perpendicular to said plane of symmetry and intersecting the water removal tank also intersect the rinsing tank, and at least a portion of the vertical planes parallel to said plane of symmetry and intersecting the water removal tank also intersect the water settling tank.

The overflow device may comprise a channel disposed along the lateral external walls of the water removal tank and have a descending slope, the high point of which is situated in the vicinity of the liquid inlet and the low point in the vicinity of the water settling tank.

The apparatus may, with advantage, include a collector device interconnecting the overflow device and the water settling tank and extending over, at most, 25% of the periphery of the water removal tank. The collector device is generally a receptacle comprising a partition which is integral with the water settling tank and which determines the level of the liquid in said receptacle.

Preferably, the heating means, for example of electrical type, are disposed in such a way as to subject all of the liquid bath contained in the water removal tank to a highly turbulent stirring action. They may, for example, comprise at least one element in contact with the bottom or in close proximity to the bottom of the water removal tank and possibly also at least one element in contact with the walls of the tank, and, in particular, at least one element in contact with that wall which defines the liquid inlet and with the wall opposite to the wall which defines the liquid inlet.

According to one embodiment of the apparatus, the water removal tank possesses a substantially rectangular horizontal section.

In order to improve the flow of the water in the water removal tank toward the overflow device and to reduce the local effect of the perturbation created in said tank by the cold liquid makeup coming from the water settling tank, the recycling circuit may comprise at its downstream end, either at least one perforated duct disposed at the bottom of the water removal tank, or a plurality of ducts communicating with orifices formed in the bottom of the water removal tank and arranged, for example, in an alternating pattern with the heating means; or a plurality of ducts communicating with orifices formed in the wall comprising the liquid inlet. The latter arrangement is especially advantageous in cases where the heating means include at least one element in contact with the wall defining the liquid inlet, the orifices formed in said walls being disposed above said element. The downstream end of the recycling circuit is preferably disposed symmetrically relative to the common plane of symmetry possessed by the water removal tank and the overflow device.

The water removal tank may be provided with at least one ultrasonic emitter device arranged to reinforce the agitation effect in the liquid bath contained in said tank.

Various examples of embodiment of the apparatus for removing water from articles are described below, by way of example only and with reference to the accompanying drawings, in which FIG. 1 is a top plan view diagrammatically showing the layout of the apparatus of this invention;

FIGS. 4, 5 and 6 are, respectively, vertical sectional views along the line C — C of FIG. 1, a plan view and a view in section on the line D — D of FIG. 1 of the form of embodiment of the water removal tank shown in FIG. 3;

FIGS. 7, 8 and 9 are views similar to FIGS. 4, 5 and 6 showing a second form of the water removal tank;

Figure 1:
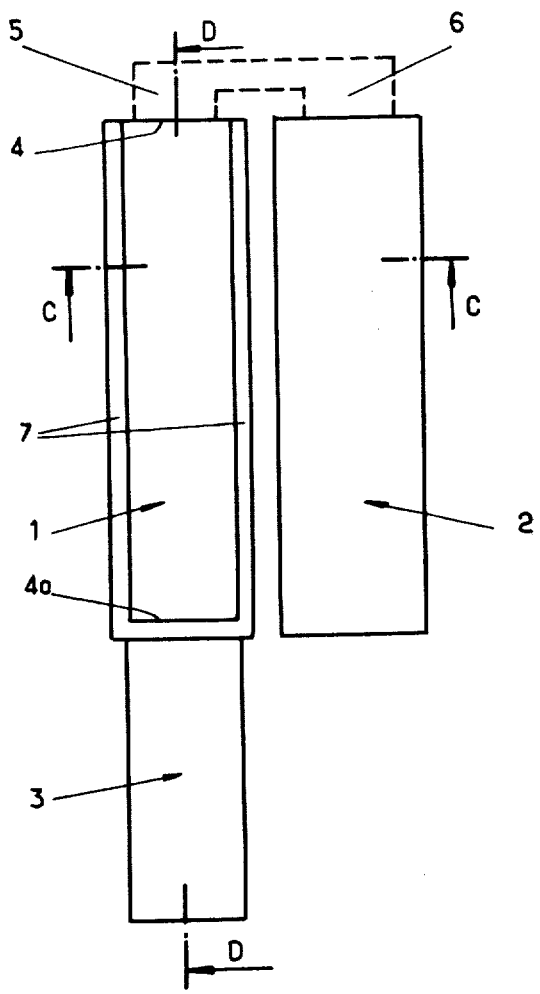
Figure 2:
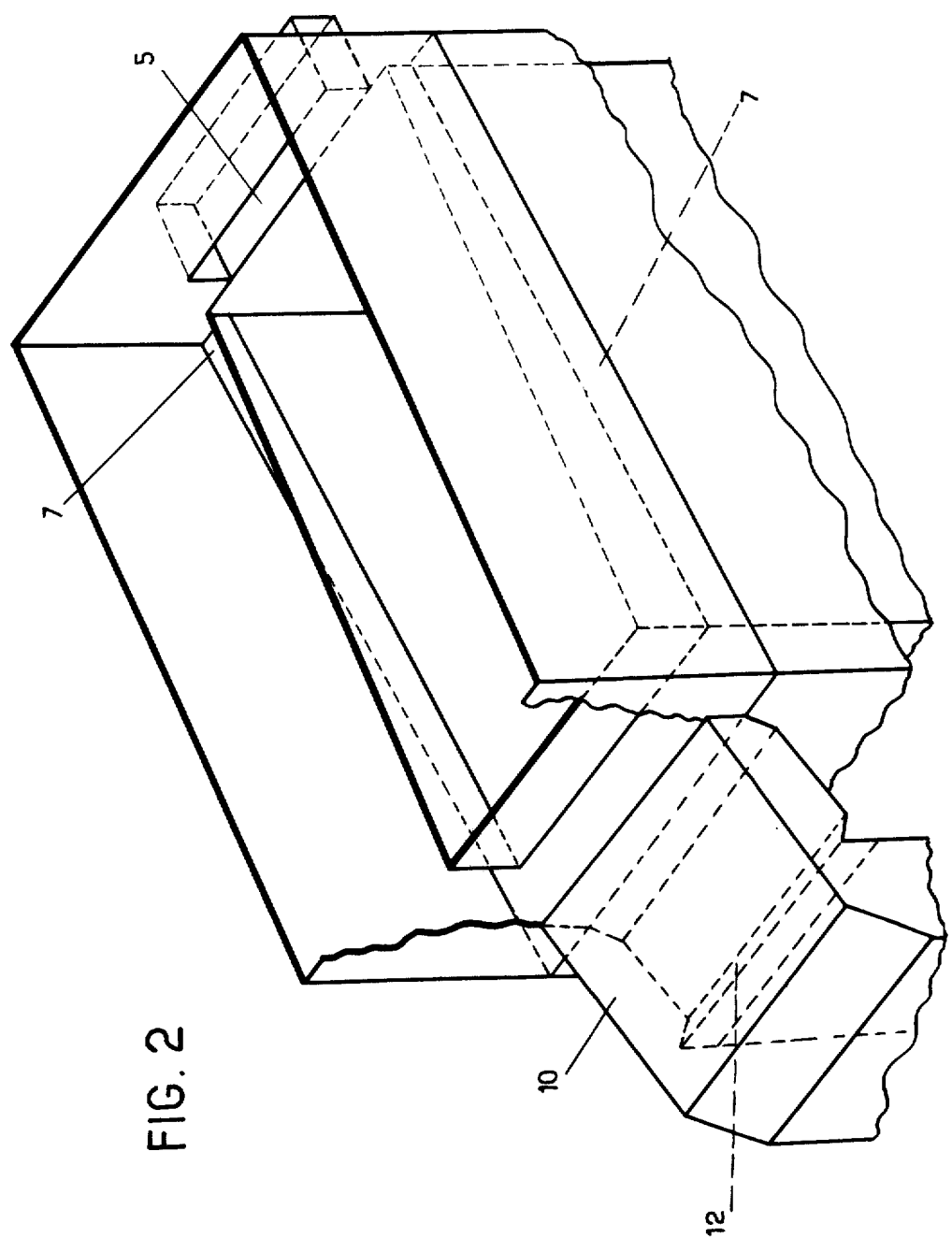
FIG. 2 is a perspective view with portions cut away to show the upper portion of the water removal tank of FIG. 1 and illustrating the liquid inlet, the overflow device and the collector device.
Figure 3:
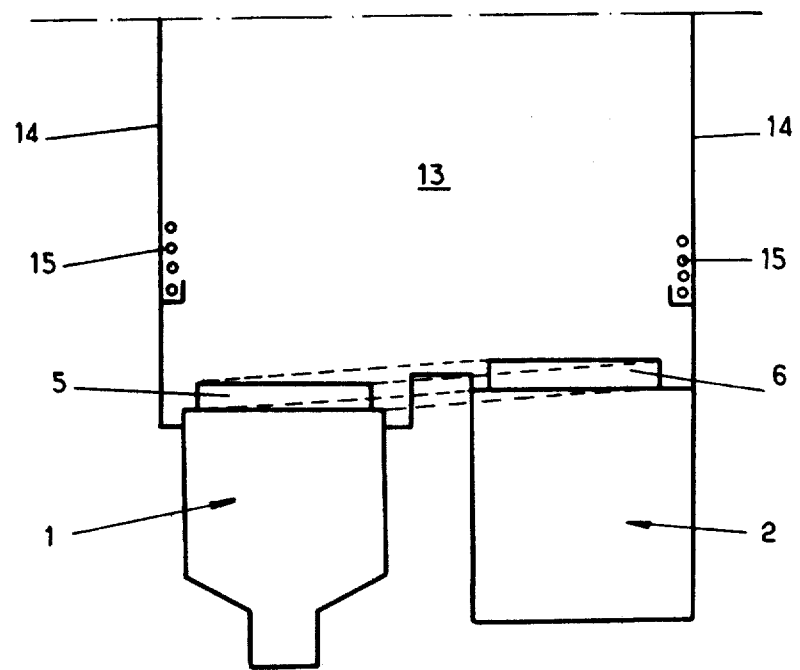
FIG. 3 is a diagrammatic view in vertical section taken along the line C — C of FIG. 1, showing a first form of embodiment of the water removal tank.

FIGS. 10, 11 and 12 are views similar to FIGS. 4, 5 and 6 showing a third form of the water removal tank; and FIGS. 13, 14 and 15 are views similar to FIGS. 4, 5 and 6 showing a fourth form of the water removal tank.

The apparatus comprises a water removal tank 1 of generally rectangular horizontal section, a rinsing tank 2, aligned side by side with the tank 1, a settling tank 3 aligned end to end with the tank 1, and a recycling circuit for the liquid composition, not shown in its entirety on the drawings, connecting together the water settling tank 3 and the water removal tank 1.

The water removal tank 1 has an end wall 4 defining a liquid inlet 5 for liquid coming from the rinsing tank 2 which itself defines a liquid outlet 6 connected by a sloped duct with the inlet 5. The top of tank 2 is higher than the top of tank 1.

The water removal tank 1 is equipped with an overflow device constituted of a channel 7 extending along and below both longitudinal sides and the opposite end wall 4a and sloping from the liquid inlet end wall 4 to the other end wall 4a. This overflow device extends over at least 40% of the periphery of the tank 1 and is symmetrical about its longitudinal vertical plane of symmetry. The tank is fitted with heater 8 and ultrasonic emitter devices 9, both arranged symmetrically of the longitudinal vertical plane of symmetry of the tank 1.

A collector device constituted of a receptable 10 connects the overflow device to the water settling tank 3. The receptacle 10 has a partition 12, over which water flows directly into the water settling tank 3, thus fixing the level of the liquid in said receptacle.

The water removal tank 1 and the rinsing tank 2 are surmounted by a common space 13, bounded by walls 14, to which are fixed condensation coils 15 and in which the vapors emanating from the tanks 1 and 2 ascend, are condensed, and flow back to tank 2.

The forms of embodiment of the water removal tank 1 shown in FIGS. 4 to 15 differ in the shape of the bottom of the tank, the disposition of the heating means and of the ultrasonic emitter devices and in the shape and disposition of the downstream end of the recycling circuit which connects together the water settling tank 3 and the water removal tank 1.

In FIGS. 4, 5 and 6, the bottom 16 of the water removal tank 1 is connected to the vertical lateral walls 17 by two vertical walls 18 extended upwards by two inclined walls 19. The heating means 8 are disposed on the wall 4 and perhaps also on the wall 4a, on the bottom 16, and on the walls 18 and the ultrasonic emitter devices 9 on the walls 19.

The recycling circuit comprises, at its downstream end, a plurality of ducts 20 communicating with orifices 21 formed in the wall 4 and disposed above the heating means 8 in contact with said wall.

In FIGS. 7, 8 and 9, the buttom 16 of the water removal tank 1 is connected directly to the lateral walls 17. The heating means 8 are disposed on the wall 4 and possibly also on the wall 4a, and on the bottom 16 and the ultrasonic emitter devices 9 on the walls 17. The recycling circuit comprises, at its downstream end, two perforated ducts 22 located at the bottom of the water removal tank 1.

In FIGS. 10 to 15, the bottom 16 of the water removal tank 1 is connected to the lateral walls 17 by the two inclined walls 19 which extend it upwards.

In FIGS. 10, 11 and 12, the heating means 8 are disposed on the wall 4 and perhaps also on the wall 4a, and on the bottom 16 and the ultrasonic emitter devices 9 on the walls 19. The recycling circuit comprises, at its downstream end, a plurality of ducts 23 communicating with orifices 24 formed in the bottom 16 of the water removal tank 1 and disposed in an alternating pattern with the heating means 8 disposed on the bottom 16.

In FIGS. 13, 14 and 15, the heating means 8 are disposed on the wall 4 and perhaps also on the wall 4a, and on the walls 19, and the ultrasonic emitter devices 9 are disposed on the bottom 16. The recycling circuit comprises, at its downstream end, a perforated duct 22 extending along the bottom of the water removal tank 1.

We claim:

1. Apparatus for removing water from the surface of an article by immersion in a liquid composition which is immiscible with water, comprising a water removal tank, a rinsing tank, a water settling tank, a recycling circuit for passing liquid composition from the water settling tank to the water removal tank, the water removal tank having a liquid inlet connected to a liquid outlet of the rinsing tank, heating means for heating liquid composition in the water removal tank, and an overflow device extending around at least 40% of the periphery of the water removal tank, in which the water removal tank, the liquid inlet, the overflow device and the heating means possess a common vertical plane of symmetry and in which the water removal tank, the rinsing tank and the water settling tank are so disposed that at least a portion of the vertical planes perpendicular to said plane of symmetry and intersecting the water removal tank also intersect the rinsing tank, and at least a portion of the vertical planes parallel to said plane of symmetry and intersecting the water removal tank also intersect the water settling tank.

2. Apparatus as claimed in claim 1, in which the overflow device comprises a channel disposed along the lateral walls of the water removal tank and has a descending slope, the high point of which is situated in the vicinity of the liquid inlet and the low point of which is situated in the vicinity of the water settling tank.

3. Apparatus as claimed in claim 1, which includes a collector device interconnecting the overflow device and the water settling tank.

4. Apparatus as claimed in claim 3, in which the collector device extends over at most 25% of the perimeter of the water removal tank.

5. Apparatus as claimed in claim 3, in which the collector device includes a partition which is integral with the water settling tank and which fixes the liquid level in said receptacle.

6. Apparatus as claimed in claim 1, in which the heating means are disposed in such a way as to subject the totality of liquid contained in the water removal tank to a highly turbulent agitation.

7. Apparatus as claimed in claim 1, in which the heating means include at least one element in contact with the bottom or in proximity to the bottom of the water removal tank.

8. Apparatus as claimed in claim 7, in which the heating means include at least one element in contact with the walls of the water removal tank.

9. Apparatus as claimed in claim 8, in which the heating means comprise at least one element in contact with the wall which defines the liquid inlet.

10. Apparatus as claimed in claim 7 in which the heating means includes at least one element in contact with the wall opposite to that wall which defines the liquid inlet.

11. Apparatus as claimed in claim 1, in which the water removal tank possesses a substantially rectangular horizontal section.

12. Apparatus as claimed in claim 1, in which the recycling circuit comprises at its downstream end at least one perforated duct disposed at the bottom of the water removal tank.

13. Apparatus as claimed in claim 1, in which the recycling circuit comprises at its downstream end a plurality of ducts communicating with orifices formed in the bottom of the water removal tank.

14. Apparatus as claimed in claim 13, in which orifices formed in the bottom of the water removal tank are disposed in an alternating pattern with the heating means.

15. Apparatus as claimed in claim 1, in which the recycling circuit comprises at its downstream end a plurality of orifices communicating with orifices formed in the wall defining the liquid inlet.

16. Apparatus as claimed in claim 1, in which the downstream end of the recycling circuit is disposed symmetrically relative to said plane of symmetry.

17. Apparatus as claimed in claim 1, in which the water removal tank includes at least one ultrasonic emitter device.

18. Apparatus for removing water from the surface of an article comprising a water removal tank, a rinsing tank substantially aligned with the water removal tank at one side thereof, a water settling tank substantially aligned with the water removal tank at one end thereof, a pretreatment tank substantially aligned with the water removal tank at the other side thereof, the articles being moved successively through the pretreatment, water removal and rinsing tanks, the water removal, rinsing and water settling tanks containing a liquid composition immiscible with water, means for flowing liquid from the rinsing tank to the water removal tank, means for overflowing liquid from the water removal tank to the settling tank and means for recirculating liquid from the settling tank to the water removal tank.

* * * * *